United States Patent
Michiels et al.

(10) Patent No.: US 9,639,674 B2
(45) Date of Patent: May 2, 2017

(54) USING SINGLE WHITE-BOX IMPLEMENTATION WITH MULTIPLE EXTERNAL ENCODINGS

(71) Applicant: NXP B.V., Eindhoven (NL)

(72) Inventors: Wil Michiels, Reusel (NL); Jan Hoogerbrugge, Helmond (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/575,972

(22) Filed: Dec. 18, 2014

(65) Prior Publication Data

US 2016/0180066 A1    Jun. 23, 2016

(51) Int. Cl.
| | |
|---|---|
| G06F 21/00 | (2013.01) |
| G06F 21/14 | (2013.01) |
| H04L 9/06 | (2006.01) |
| H04L 9/00 | (2006.01) |

(52) U.S. Cl.
CPC ............. *G06F 21/14* (2013.01); *H04L 9/002* (2013.01); *H04L 9/06* (2013.01); *H04L 9/0631* (2013.01); *G06F 2221/0748* (2013.01); *H04L 2209/16* (2013.01)

(58) Field of Classification Search
CPC ......... H04L 9/00; H04L 9/06; H04L 2209/04; H04L 2209/16; G06F 21/14
USPC ................................ 713/189–194; 380/28–29
See application file for complete search history.

(56) References Cited

U.S. PATENT DOCUMENTS

| | | | |
|---|---|---|---|
| 2005/0259814 A1 | 11/2005 | Gebotys | |
| 2007/0014394 A1 | 1/2007 | Harder et al. | |
| 2010/0054461 A1* | 3/2010 | Ciet ..................... | H04L 9/002 380/29 |
| 2012/0002807 A1* | 1/2012 | Michiels ............... | H04L 9/002 380/28 |
| 2012/0179919 A1* | 7/2012 | Farrugia ............... | G06F 21/602 713/193 |
| 2015/0215117 A1* | 7/2015 | Kim ..................... | G09C 1/00 380/28 |

FOREIGN PATENT DOCUMENTS

| | | |
|---|---|---|
| EP | 2960891 A1 | 12/2015 |
| EP | 2996278 A1 | 3/2016 |

(Continued)

OTHER PUBLICATIONS

Karroumi, Mohamed. "Protecting white-box AES with dual ciphers." Information Security and Cryptology—ICISC 2010. Springer Berlin Heidelberg, 2011. 278-291.*

(Continued)

*Primary Examiner* — Madhuri Herzog

(57) ABSTRACT

A method of performing a keyed cryptographic operation by a cryptographic system mapping an encoded input message to an output message, including: receiving an encoding selection parameter p; receiving the encoded input message, wherein the encoding on the input message corresponds to the encoding selection parameter p; decoding the input message using an inverse of a default input encoding; computing a first portion of the cryptographic operation on the decoded input message to produce a first portion output; and compensating the first portion output based upon the encoding selection parameter p.

28 Claims, 5 Drawing Sheets

(56) References Cited

FOREIGN PATENT DOCUMENTS

WO   2010/102960 A1   9/2010
WO   2010146139 A1   12/2010

OTHER PUBLICATIONS

Wyseur, Brecht, et al. "Cryptanalysis of white-box DES implementations with arbitrary external encodings." Selected Areas in Cryptography. Springer Berlin Heidelberg, 2007.*

Michiels, Wil, and Paul Gorissen. "Mechanism for software tamper resistance: an application of white-box cryptography." Proceedings of the 2007 ACM workshop on Digital Rights Management. ACM, 2007.*

De Mulder, Yoni, Brecht Wyseur, and Bart Preneel. "Cryptanalysis of a perturbated white-box AES implementation." International Conference on Cryptology in India. Springer Berlin Heidelberg, 2010.*

Xiao, Yaying, and Xuejia Lai. "A secure implementation of white-box AES." 2009 2nd International Conference on Computer Science and its Applications. IEEE, 2009.*

International Extended Search Report for the International application No. 15197079.5 dated Mar. 5, 2016.

"Syncrosoft MCFACT—Secure Data Processing Technology", Re-trust Sixth Quarterly Meeting, Mar. 11, 2008, Villach, Austria, 108 pages.

Billet, Olivier et al., "Cryptanalysis of a White Box AES Implementation", Selected Areas in Cryptography, vol. 3357 of Lecture Notes in Computer Science,, Springer, 2005, 227-240.

Chow, Stanley et al., "A White-Box DES Implementation for DRM Applications", Digital Rights Management: ACM CCS-9 Workshop, DRM 2002, Washington, D.C., USA, Nov. 18, 2002, 1-16.

Chow, Stanley et al., "White-Box Cryptography and an AES Implementation", Cryptography: 9th Annual International Workshop, SAC 2002, St. John's, Newfoundland, Canada, Aug. 15, 2002.

Michiels, W., "Opportunities in white-box cryptography", IEEE Security & Privacy, vol. 8, Issue 1, Jan.-Feb. 2010, pp. 64-67.

\* cited by examiner

WHITE-BOX IMPLEMENTATION

FUNCTIONS $f_i$, $g_i$, FIXED

USING SINGLE WHITE-BOX IMPLEMENTATION WITH MULTIPLE EXTERNAL ENCODINGS

TECHNICAL FIELD

Various exemplary embodiments disclosed herein relate generally to securing software components that perform a cryptographic function against attacks including implementing padding in a white-box implementation.

BACKGROUND

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. For example, one way to obscure these functions is by the use of lookup tables.

Content providers must deliver content to legitimate users across a hostile network to a community where not all users or devices can be trusted. This has lead to the development of white-box cryptography. In the white-box cryptography scenario it is assumed that the user has complete control of the hardware and software that provides access to the content, and an unlimited amount of time and resources to attack and bypass any content protection mechanisms. The secure software code that enforces the terms and conditions under which the content may be used should be tamper resistant. Digital rights management is a common application of secure software applications. The general approach in digital rights management for protected content distributed to user devices is to encrypt the digital content using for example, DES (Data Encryption Standard), AES (Advanced Encryption Standard), or using other known encryption schemes, and to use decryption keys to recover the digital content. These decryption keys must be protected to prevent unauthorized access to protected material.

In the digital right management scenario, the attacker has complete control of the software enforcing the management and access to the protected content. Accordingly, the attacker can modify software and also seek to obtain cryptographic keys used to encrypt the protected content. Such keys may be found by analyzing the software Regarding key distribution, a media player has to retrieve a decryption key from a license database in order to play back the media. The media player then has to store this decryption key somewhere in memory for the decryption of the encrypted content. This leaves an attacker two options for an attack on the key. First, an attacker may reverse engineer the license database access function allowing the attacker to retrieve asset keys from all license databases. In this situation the attacker does not need to understand the internal working of the cryptographic function. Second, the attacker may observe accesses of the memory during content decryption, thus the attacker may retrieve the decryption key. In both cases the key is considered to be compromised.

The widespread use of digital rights management (DRM) and other secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the secure functions need to be carried out in a manner that prevents the disclosure of secret information used in the secure functionality. White-box cryptography functions may be implemented in various ways. Such methods include: obscuring the software code; using complex mathematical functions that obscure the use of the secret information; using look-up tables; using finite state machines; or any other methods that carry out cryptographic functions but hide the secret information needed for those secure functions. A white-box implementation may also contain components that include anti-debugging and tamper-proofing properties.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a non-transitory machine-readable storage medium encoded with instructions for execution by a keyed cryptographic operation by a cryptographic system mapping an encoded input message to an output message, including: instructions for receiving an encoding selection parameter p; instructions for receiving the encoded input message, wherein the encoding on the input message corresponds to the encoding selection parameter p; instructions for decoding the input message using an inverse of a default input encoding; instructions for computing a first portion of the cryptographic operation on the decoded input message to produce a first portion output; and instructions for compensating the first portion output based upon the encoding selection parameter p.

Further, various exemplary embodiments relate to a non-transitory machine-readable storage medium encoded with instructions for execution by a keyed cryptographic operation by a cryptographic system mapping an input message to an encoded output message, including: instructions for receiving a encoding selection parameter p; instructions for receiving the input message; instructions for computing a first portion of the cryptographic operation on the input message to produce a first portion output; instructions for compensating the first portion output based upon the encoding selection parameter p; instructions for performing a second portion of the cryptographic operation on the compensated first portion output to produce a second portion output; and instructions for encoding the second portion output using a default output encoding.

Further, various exemplary embodiments relate to a method of performing a keyed cryptographic operation by a cryptographic system mapping an encoded input message to an output message, including: receiving an encoding selection parameter p; receiving the encoded input message, wherein the encoding on the input message corresponds to the encoding selection parameter p; decoding the input message using an inverse of a default input encoding; computing a first portion of the cryptographic operation on the decoded input message to produce a first portion output; and compensating the first portion output based upon the encoding selection parameter p.

Further, various exemplary embodiments relate to a method of performing a keyed cryptographic operation by a cryptographic system mapping an input message to an encoded output message, including: receiving a encoding selection parameter p; receiving the input message; computing a first portion of the cryptographic operation on the input message to produce a first portion output; compensating the first portion output based upon the encoding selection parameter p; performing a second portion of the cryptographic operation on the compensated first portion output to produce a second portion output; and encoding the second portion output using a default output encoding.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
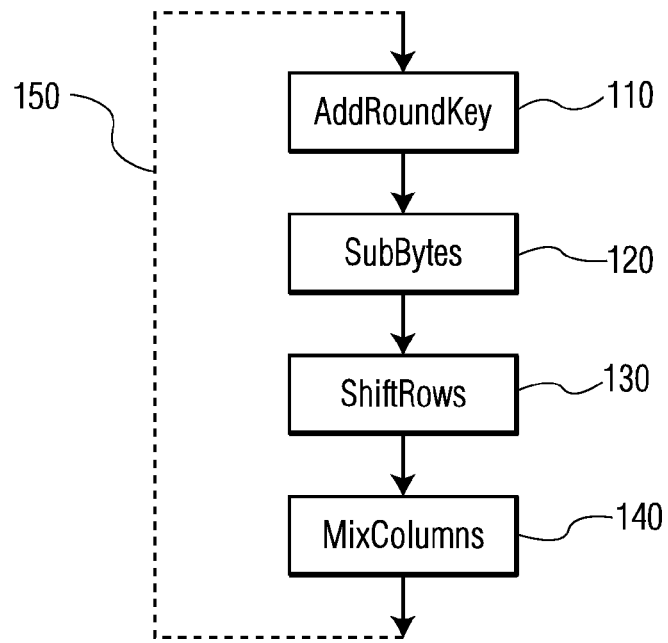
FIG. 1 illustrates the main steps of a round of AES.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented. While the description of embodiments below are directed to software implementation running on a processor, it is noted that these embodiments may also be partially or completely implemented in hardware as well. The lookup tables and finite state machines that are described may be implemented in hardware to carry out the various functions described.

A table-based approach to a white-box implementation of the Advanced Encryption Standard (AES) and the Data Encryption Standard (DES) were proposed in the following papers: "White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1"; and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2". Chow 1 and Chow 2 disclose methods of using a table-based approach to hide the cryptographic key by a combination of encoding its tables with random bijections, and extending the cryptographic boundary by pushing it out further into the containing application.

As noted, for many cryptographic operations it is desired to have a white-box implementation. The invention may be applied, for example, to symmetric and asymmetric cryptographic operations. Also, the invention may be applied to block ciphers, stream ciphers, message authentication schemes, signature schemes, etc. Note that the invention may also be applied to hash functions. The latter is especially useful if the hash function is used as a building block which processes secret information, e.g., a secret key, secret data, etc. For example, the invention may be applied to a hash function used in a keyed-Hash Message Authentication Code (HMAC or KHMAC). Well known block ciphers include: Advanced Encryption Standard (AES), Secure And Fast Encryption Routine, (SAFER, and variants SAFER+ and SAFER++), Blowfish, Data Encryption Standard (DES), etc. A well known stream cipher is RC4. Moreover any block cipher can be used as stream cipher using an appropriate mode of operation, e.g., Cipher feedback (CFB), Counter mode (CTR), etc.

The input message can represent, e.g., encrypted content data, such as multi-media data, including audio and/or video data. The encrypted content data may also include encrypted software, e.g., encrypted computer code representing some computer application, e.g., a computer game, or an office application. The input message may also represent a key for use in a further cryptographic operation. The latter may be used, for example, in a key exchange protocol, wherein a white-box implementation according to the invention encrypts and/or decrypts data representing a new key. The input data may also be plain data, for example, plain user data. The latter is especially advantageous in message authentication schemes. A white-box implementation according to the invention may have the property that the implementation may only be used for encryption, only be used for decryption, but not for both. For example, this property can be achieved if the implementation uses look-up tables which are not bijective, for example, a look-up table having more input bits than output bits. Accordingly, if a user only has a white-box decryptor, he may verify a MAC code but not create new MACS. This strengthens the non-repudiation properties of such a message authentication scheme.

The white-box implementation may be implemented using a plurality of basic blocks. The plurality of basic blocks is interconnected, in the sense that some of the blocks build on the outputs of one or more of the previous blocks. A basic block may be implemented in hardware, for example, as a computer chip. A basic block may use a switch board, a state machine or any other suitable construction for implementing functions in computer hardware. A basic block may also be implemented in software running on a general purpose computer chip, e.g. a microprocessor. For example, a basic block may use a plurality of computer instructions, including arithmetical instructions, which together implement the functionality of the basic block. A widely used implementation for the basic block, which may be used both in software and hardware, is a look-up table. For example, Chow 1 and Chow 2 take this approach to implement the AES and DES block ciphers. A look-up table implementation includes a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bit-strings, the look-up table may be restricted to storing a list of the output values. A particular input number may, e.g., be mapped to the particular output which is stored at a location indicated by the number. Further, finite state machines or code obfuscation may be used to implement the white-box implementation.

For example, a look up table for a function may be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to output in irregular ways. A white-box implementation can be further obfuscated, as is explained below, by applying to one or more of its look-up tables a fixed obfuscating input encoding and a fixed output encodings. The results of applying a fixed obfuscating input encoding and output encodings is then fully pre-evaluated. Using this technique, a look-up table would be replaced by an obfuscated look-up table which has the same dimensions, that it takes the same number input bits and produces the same number of output bits. The input encoding and output encoding used in such obfuscation are not explicit in the final white-box implementation.

The network of basic blocks are arranged to compute an output message when they are presented with an input message. Typically, the input message is operated upon by a number of basic input blocks. A number of further basic blocks may take input from one or more of the basic input blocks and/or from the input. Yet further basic blocks can take input in any combination of the input message, the output of basic input blocks and the output of the further basic blocks. Finally some set of basic exit blocks, i.e., at least one, produce as output all or part of the output-message. In this manner a network of basic blocks emerges which collectively computes the mapping from the input message to output message.

The key used may be a cryptographic key and may contain sufficient entropy to withstand an anticipated brute force attack. It is noted that in a white-box implementation, the key is typically not explicitly present in the implementation. This would risk the key being found by inspection of the implementation. Typically, the key is only present implicitly. Various ways are known to hide a key in a cryptographic system. Typically, at least the method of partial evaluation is used, wherein a basic block which needs key input is evaluated in-so-far that it does not depend on the input-message. For example, a basic operation wherein an input-value, a masking value, which does not depend on the input-message, e.g. a value from an S-box, and a key-value need to be XORed can be partially evaluated by XORing the key value and the masking value together beforehand. In this way the operation still depends on the key-value although the key-value is not explicitly present in the implementation. Instead, only the XOR between the key-value and masking-value is present in the implementation. Note that, more complicated ways and/or further ways of hiding the keys are compatible with embodiments of this invention.

Below exemplary embodiments are described using the AES (Advanced Encryption Standard) block cipher, because AES has become a widely used standard for block ciphers. AES is a block cipher with a block size of 128 bits or 16 bytes. The plaintext is divided in blocks of 16 bytes which form the initial state of the encryption algorithm, and the final state of the encryption algorithm is the cipher text. At any given point in the encryption algorithm these 16 bytes are the state of the encryption algorithm. To conceptually explain AES, the bytes of the state are organized as a matrix of 4×4 bytes. AES includes a number of rounds, which depend on the key size. Each round includes similar processing steps operating on bytes, rows, or columns of the state matrix, each round using a different round key in these processing steps. In the discussion using AES as an example, it is noted that AES defines a round in a specific manner. In the embodiments below, a round is any grouping of steps that includes at least one non-linear mapping function, such as an S-box in AES. Accordingly, a round as described below includes one non-linear mapping function and any combination of other steps of the cryptographic function. Further, the boundary of the round may start with the non-linear mapping function, for example an S-box, or any other operation that may be merged with the non-linear mapping function, for example a key addition.

FIG. 1 illustrates some main processing steps of a round of AES. The processing steps include:

AddRoundKey 110—each byte of the state is XORed with a byte of the round key;

SubBytes 120—a byte-to-byte permutation using a lookup table;

ShiftRows 140—each row of the state is rotated a fixed number of bytes; and

MixColumns 150—each column is processed using a modulo multiplication in $GF(2^8)$.

The steps SubBytes 120, ShiftRows 130, and MixColumns 150 are independent of the particular key used. The key is applied in the step AddRoundKey 110. Except for the step ShiftRows 140, the processing steps can be performed on each column of the 4×4 state matrix without knowledge of the other columns. Therefore, they can be regarded as 32-bit operations as each column consists of four 8-bit values. Dashed line 150 indicates that the process is repeated until the required number of rounds has been performed.

Each of these steps or a combination of steps may be represented by a lookup table or by a network of lookup tables. If the AddRoundKey 110 step is implemented by XORing with the round key, then the key is visible to the attacker in the white-box attack context. The AddRoundKey 110 step can also be embedded in lookup tables, which makes it less obvious to find out the key. In fact, it is possible to replace a full round of AES by a network of lookup tables. For example, the SubBytes 120, ShiftRows 130, and MixColumns 150 steps may be implemented using table lookups. Below a possible white-box implementation of AES in sufficient detail is discussed to describe the embodiments of the invention below, but further detailed descriptions of such an implementation are found in Chow 1. Also, other variations in the lookup table implementation may be used which are within the scope of the invention.

Figure 2:
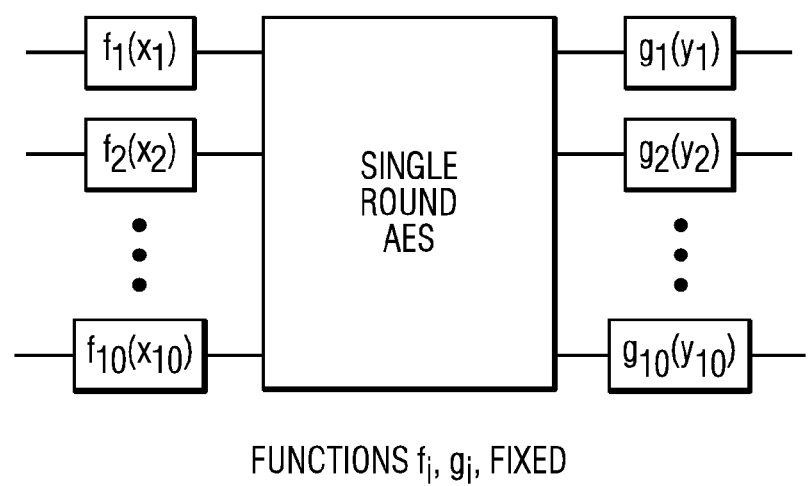
FIG. 2 illustrates a white-box AES implementation with fixed encodings on the input of the rounds.

Both the table-based white-box implementations and the finite state machine implementations have the property that all intermediate values in the implementation are encoded (as compared to a standard implementation). Examples of white-box implementations using finite state machines are disclosed in U.S. Patent Publication 2007/0014394 entitled "Data Processing Method" and a presentation at the Re-trust Sixth Quarterly Meeting entitled "Synchrosoft MCFACT™ Secure Data Processing Technology" by Wulf Harder and Ads Straujums dated Mar. 11, 2008, which each are hereby incorporated by reference for all purposes as if fully set forth herein. FIG. 2 illustrates a white-box AES implementation with fixed encodings on the input of the rounds, i.e., on the input of the S-boxes. As shown, each of the 16 input bytes are encoded by $f_i$ and each of the output bytes are encoded by $g_i$.

In order to describe embodiments of the invention, a basic description of a table-based white-box AES implementation will be described. For a more detailed description of a method for implementing a table-based white-box AES see Chow 1. Chow 1 illustrates a specific implementation that breaks up certain functions using tables of specified sizes. It is well understood that various other divisions of the tables may be made resulting in different functions for the look-up tables and different sizes. Further, while the embodiments of the invention described below use a table-based white-box implementation of AES, other ciphers and cryptographic functions may be implemented according to the embodiments described. Also, other types of white-box implementations may be used instead of the table-base implementation, for example, a finite-state implementation.

The description of the table-based white-box AES is split into two steps. In the first step, a round of AES is described as a network of lookup tables. In the second step, the tables are obfuscated by encoding their input and output.

Step 1: Implementing AES as a Network of Lookup Tables.

AES operates on data blocks of 16 bytes. These are typically described as a 4×4 byte matrix, called the state including bytes $x_{1,1}, x_{1,2}, x_{1,3}, \ldots x_{4,4}$. A round of AES as described above with respect to FIG. 1 include the following operations: AddRoundKey 110, SubBytes 120, ShiftRows 130, and MixColumns 140. The first two operations, AddRoundKey and SubBytes can be merged into a single T-box operation. That is, we can define a byte-to-byte function $T_{i,j}$ for input byte $x_{i,j}$ as $T_{i,j}(x_{i,j})=S(x_{i,j} \oplus k_{i,j})$ where $k_{i,j}$ is a single byte of a 16 byte round key based upon the AES key. Let $y_{i,j}$ be the output of $T_{i,j}$. The ShiftRows operations is just an index-renumbering of the output bytes $y_{i,j}$. For ease of presentation, this operation is omitted in this description, but may be incorporated into the look-up table implementing Ti,j or implemented as a separate manipulation of the state matrix. In the MixColumns step, an output byte $z_{i,j}$ of the round is computed from the 4 output bytes $y_{1,j}, y_{2,j}, y_{3,j},$ and $y_{4,j}$ via the algebraic expression $z_{1,j}=MC_{l,1} \cdot y_{1,j} \oplus MC_{l,2} \cdot y_{2,j} \oplus MC_{l,3} \cdot y_{3,j} \oplus MC_{l,4} \cdot y_{4,j}$ in $GF(2^8)$ for some constants $MC_{l,r}$.

Now define a lookup table for each byte-to-byte function $Q_{i,j,l}(x_{i,j})=MC_{l,i} \cdot T_{i,j}(x_{i,j})$ with $i,j,l=1, 2, \ldots, 16$. Then any output byte $z_{l,j}$ may be computed by XORing the results of these lookup tables, i.e., $z_{l,j}=Q_{1,j,l}(x_{1,j}) \oplus (x_{2,j}) \oplus Q_{3,j,l}(x_{3,j}) \oplus Q_{4,j,l}(x_{4,j})$. Note that the index i,j,l of Q-box can be interpreted as "the contribution of input byte i,j of a round to output byte l,j of the round". The XOR may be implemented to operate on each of two nibbles (i.e., 4-bit values) as a lookup table to reduce the size of the XOR tables. Accordingly, the Q-box may be implemented to produce output nibbles so that the size of the tables is reduced. Therefore, the computation of each output byte $z_{l,j}$ of an AES-round has been described as a network of lookup tables. The network of lookup tables to compute a single output nibble of byte $z_{2,3}$ is shown in FIG. 3.

Figure 3:
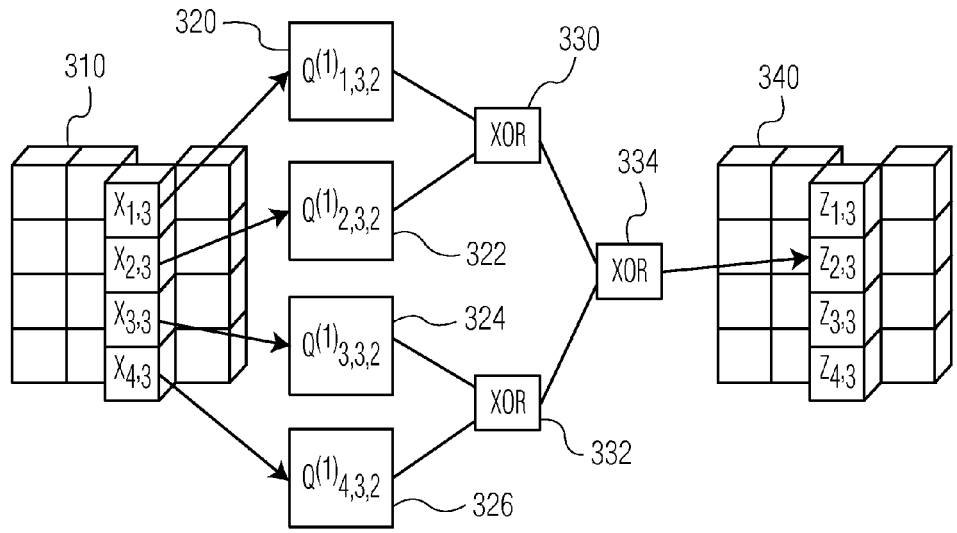
FIG. 3 illustrates the computation of one output nibble by means of a network of look-up tables.

FIG. 3 illustrates the computation of one output nibble by means of a network of look-up tables. The superscript index (1) in the Q-boxes indicates that the tables only provide the first nibble of the output of the Q-box. A set of input bytes $x_{1,3}, x_{2,3}, x_{3,3},$ and $x_{4,3}$ in the input state 310 are input into the Q-boxes 320, 322, 324, 326. The outputs of lookup tables 320 and 322 are fed into the XOR 330, and the outputs of lookup tables 324 and 326 are fed into the XOR 332. The outputs of XORs 330 and 332 are fed into XOR 334. The output of XOR 334 is the first nibble of the output $z_{2,3}$ of output state 340. The second nibble of the output $z_{2,3}$ of output state 340 may be calculated in the same way using additional Q-boxes along with a similar XOR network. Further, additional sets of tables may be implemented to completely convert the input state 310 into the output state 340 by receiving a column of bytes from the input state and converting them into the output of the corresponding column of the output state.

Step 2: Obfuscating the Tables and the Intermediate Values

Figure 4:
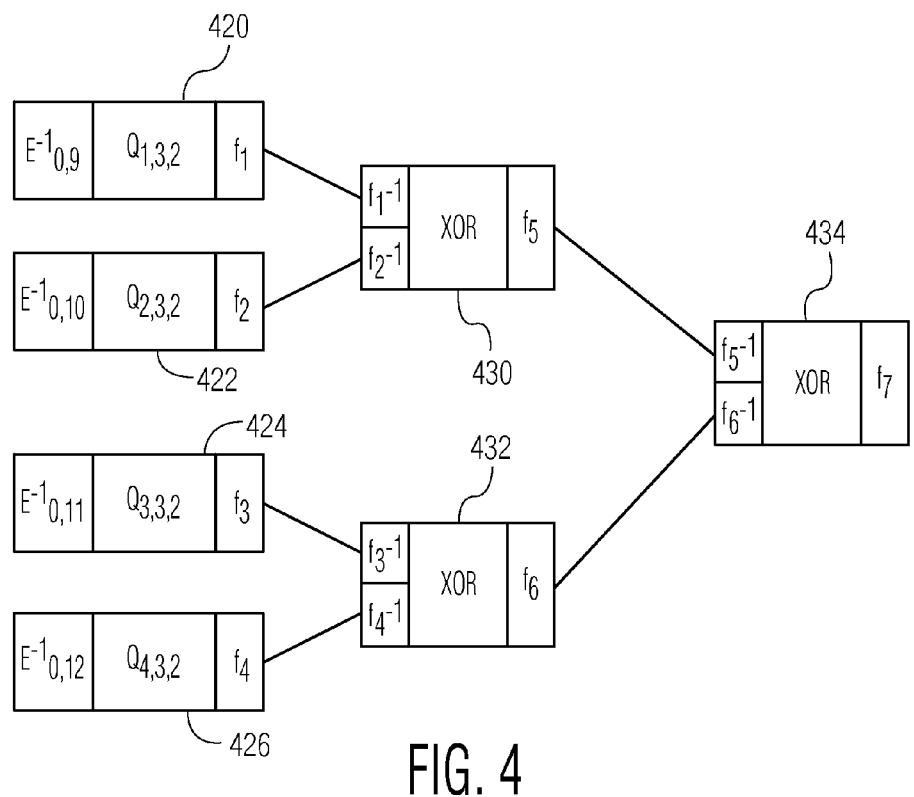
FIG. 4 illustrates a portion of the network table of FIG. 3 obfuscated by encoding the inputs and outputs.

In the implementation depicted in FIG. 3, the key may easily be extracted from the Q-boxes. Just applying the inverse MixColumns multiplication and the inverse S-box to the output reveals the plain AddRoundKey operation. To prevent this, the input and outputs of all lookup tables are encoded with arbitrary bijective functions. This is described in Chow 1. This means that a lookup table is merged with an encoding function that encodes the output and with a decoding function that decodes the input. The encodings are chosen such that the output encoding of one table matches the input encoding assumed in the next tables. A portion of the implementation of FIG. 3 is depicted in FIG. 4 for the first round. In this example, the input to the round is not encoded in order to be compliant with AES, but the output of the round is encoded. The output encoding is handled in the next round. That is, unlike the first round, the second round (and the later rounds) assumes that the input is encoded. Alternatively, the first round may receive an encoded input. This input encoding must then be applied elsewhere in the software program containing the white-box implementation. Similarly, the last round may or may not include an output encoding depending on whether the output is to be AES compliant. Note that in the white-box implementation obtained, both the lookup tables and the intermediate values are obfuscated.

FIG. 4 illustrates a portion of the network table of FIG. 3 obfuscated by encoding the inputs and outputs. The lookup tables 420, 422, 424, 426 correspond to lookup tables 320, 322, 324, 326 of FIG. 3. The input of lookup tables 420, 422, 424, 426 are encoded by functions $E_9$, $E_{10}$, $E_{11}$, $E_{12}$, respectively. The outputs of lookup tables 420, 422, 424, 426 are encoded by functions $f_1$, $f_2$, $f_3$, $f_4$ respectively. XOR 430 corresponds to XOR 330. The inputs of XOR 430 decode input using $f_1^{-1}$ and $f_2^{-1}$. The output of XOR 430 is then encoded by function $f_5$. In a similar manner XORs 432, 434 have input decodings and output encodings as illustrated. The output $z_{2,3}$ is encoded using $f_7$.

Besides hiding the key, a white-box implementation may be used to realize several interesting goals. For instance, as indicated by Chow et al., they can be used to hook a cryptographic functionality to the surrounding program. Further, U.S. patent application Ser. No. 14/220,321 entitled "SECURITY MODULE FOR SECURE FUNCTION EXECUTION ON UNTRUSTED PLATFORM" filed Mar. 20, 2014 describes how a white-box implementation may be used to put an internal encoding on data in a secure way. This application is based on adding an external encoding to the white-box implementation. That is, instead of having a white-box implementation with an input and output of plaintext and cipher text associated with the implemented cipher, the input and/or output is encoded by some secret function. It may be desirable to allow various different external encodings. Because white-box implementations are typically large, it may be desirable to limit the number of such implementations that have to be stored. The embodiments described herein illustrate a method for providing multiple different external encodings for a single white-box implementation.

In order to implement multiple external encodings for a single white-box implementation, the white-box implementation described above may be extended to include the ability to handle multiple external input and/or output encodings. This means that the white-box implementation may be extended to compensate for differences in the external input encoding and/or that it can compute outputs according to different external output encodings. Further, the white-box implementation may receive a value indicating the encoding applied to the input or to be applied to the output. This may be accomplished in two different ways. First, the white-box implementation may receive an additional input parameter that specifies the external input encoding and/or the external output encoding that should be applied. Secondly, the encoding may be specified by a property of the input, e.g., padding in the input message may indicate the specific external input and/or output encoding.

First, an embodiment of a white-box implementation with multiple input encodings will be described. In the example embodiment, two different encodings are described, but this may be extended to any number of additional encodings.

The white-box implementation may receive an input parameter p indicating which of two different input encodings may be used. The two external input encodings may be denoted by $E_1=(E_{1,1}, E_{1,2}, \ldots, E_{1,16})$ and $E_2=(E_{2,1}, E_{2,2}, \ldots, E_{2,16})$, where $E_{p,j}$ is a bijective function that encodes the jth input byte according to external input encoding $E_p$. For each i, let the $i^{th}$ component of the external encoding $E_p$ be such that the following equation is satisfied $$S \circ \oplus_{k_i} \circ E_{0,i}^{-1} = A_p \circ S \circ \oplus_{k_i} \circ E_{p,i}^{-1} \qquad (1)$$

where $\oplus_{k_i}$ denotes the key-addition operation related to the $i^{th}$ input byte, $A_p$ is a randomly chosen bijective linear function, and $E_{0,i}$ is the default external byte encoding shown in FIG. 4. If $E_1$ is chosen randomly, then this equation holds for p=1, 2 if $$E_{0,i} = E_{1,i} \circ \oplus_{k_i} \circ S^{-1} \circ A_1^{-1} \circ S \circ \oplus_{k_i} \qquad (2)$$

and $$E_{2,i} = E_{0,i} \circ \oplus_{k_i} \circ S^{-1} \circ A_2^{-1} \circ S \circ \oplus_{k_i}. \qquad (3)$$

The embodiment of the white-box implementation with multiple input encodings may be described by extending the table network of FIG. 4 where the internal encodings $f_i$ are omitted for clarity. These internal encodings may be applied in a post-processing step on the obtained extended table network.

Figure 5:
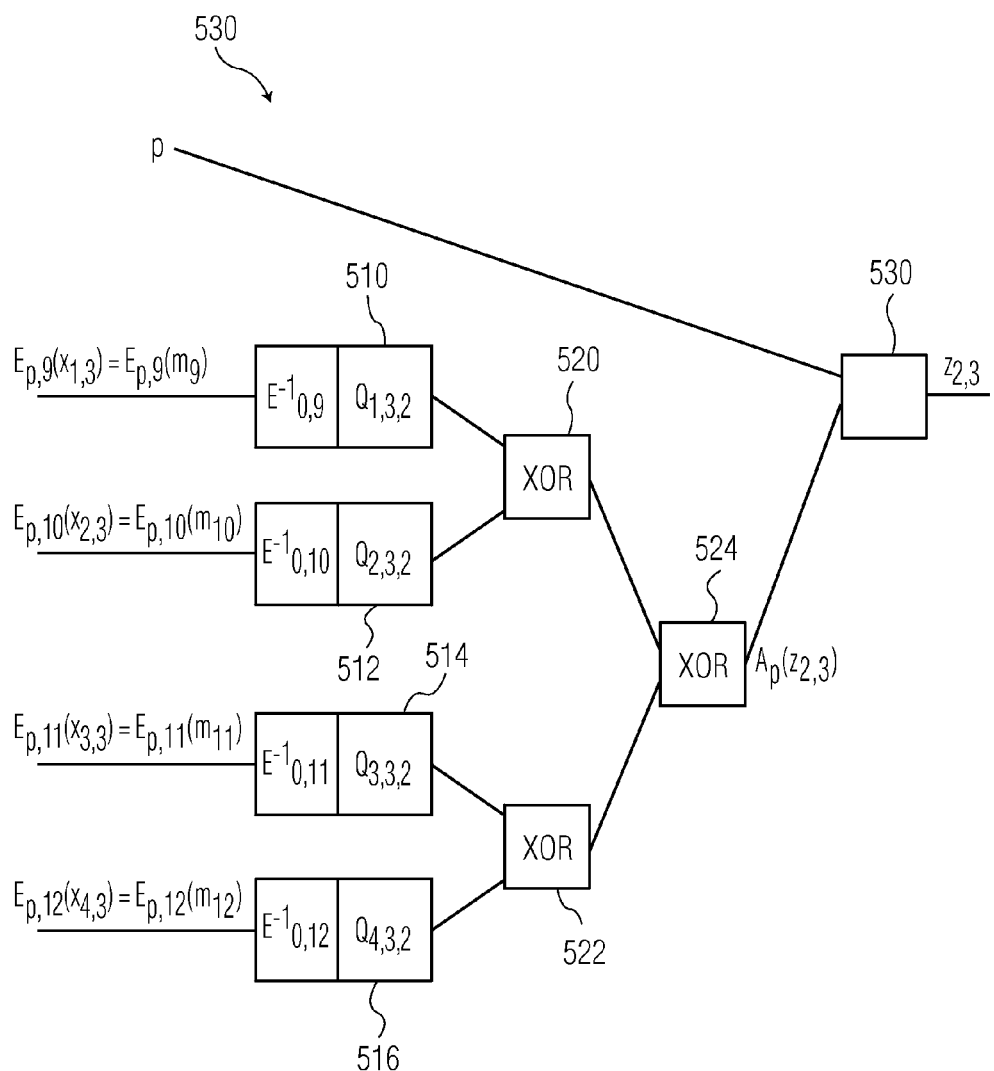
FIG. 5 illustrates an embodiment of a white-box implementation with multiple input encodings.

FIG. 5 illustrates an embodiment of a white-box implementation with multiple input encodings 500. The white-box implementation 500 is an extension of the white-box implementation of FIG. 4 without internal encodings but with input decoding $E_0^{-1}$. Let $x_{i,j}$ and $y_{i,j}$ be as defined above. That is, $x_{i,j}$ is the input of the $(i,j)^{th}$ T-box that underlies the $(i,j,l)^{th}$ Q-boxes for any 1, and $y_{i,j}$ is the output of this T-box. Then it follows from (1) that the output of the T-box $T_{i,j}$ underlying $Q_{i,j,l}$ is given by $A_p(y_{i,j})$. Hence, if no changes are made to the network of FIG. 4, $A_p(z_{i,j})$ is computed instead of $z_{i,j}$. That is, in order to compensate for the different external encodings and the input decoding $E_0^{-1}$, the linear mapping $A_1$ in case p=1 and $A_2$ in case p=2 is removed. This may be done by providing the white-box implementation with additional input parameter p and extending the table network such that the effect of the difference in external encoding on the intermediate values is removed. FIG. 5 illustrates how the table network of FIG. 4 may be extended such that the proper linear mapping is removed.

The white-box implementation 500 includes Q-boxes 510, 512, 514, 516 that receive encoded input bytes. The encoding on the input bytes is specified by the input parameter p. The Q-boxes 510, 512, 514, 516 decode the inputs using the default input decoding $E_0^{-1}$. The outputs of the Q-boxes 510, 512, 514, 516 are then fed into an XOR network including XORs 520, 522, 524 to produce the output $A_p(z_{2,3})$. An encoding compensator 530 receives inputs p and $A_p(z_{2,3})$ and produces $z_{2,3}$ as an output. The encoding compensator 530 selects and applies an inverse of the function $A_p$. As described above, the white-box implementation 500 may be replicated to process all of the input bytes received in an AES implementation. Also, the white-box implementation 500 may be extended to handle more than 2 different input encodings.

The input parameter p may be independently received by the white-box implementation 500. The input p may be encoded for example using the encoding $E_0$. Alternatively, the value p may be a specific number of bits specified in the input. These bits may be encoded, for example using the encoding $E_0$, or may not be encoded. The bits specifying p may be extracted and used by the encoding compensator 530.

A second embodiment of a white-box implementation using multiple encoded outputs will now be described. The second embodiment will illustrate the use of two different external output encodings. The second embodiment is similar to the first embodiment.

As for the first embodiment, the starting point is the white-box implementation discussed above in FIG. 4 that depicts the computation of a single output nibble of the first round. Again, the internal encodings are omitted. These internal encodings may be applied in a post-processing step.

Figure 6:
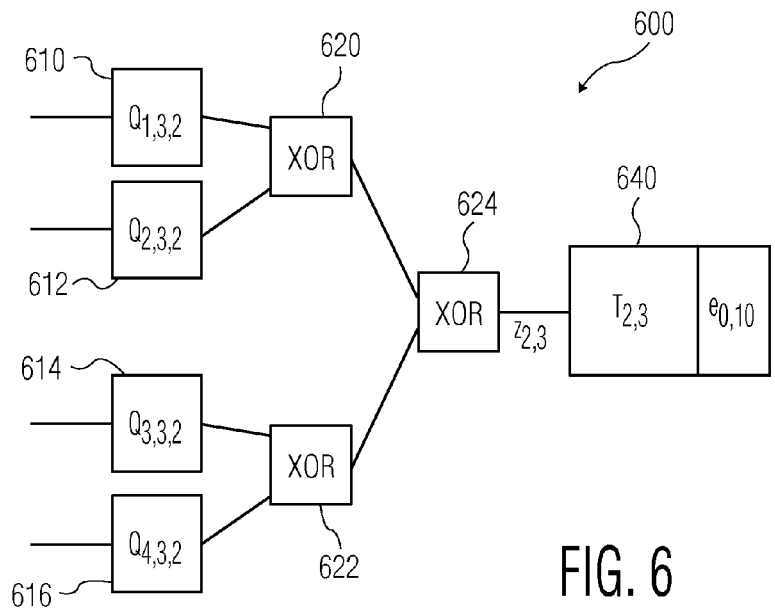
FIG. 6 illustrates the computation of an externally encoded output byte from the input to round 9.

Because rounds 1-9 in AES have the same round function, the white-box implementation looks similar for these rounds to the table network of FIG. 4. Only the external decoding at the beginning of round 1 is replaced by an internal decoding for later rounds. The last round function is different. In Round 10, AES consists of the following operations: AddRoundKey, SubBytes, ShiftRows, and AddRoundKey. Hence, the MixColumns operation is replaced by AddRoundKey. If the ShiftRows operation is ignored, as this is simply a renumbering of the indices, the last round may be implemented by 16 byte-to-byte tables in the following way. Let for each byte $x_{i,j}$ of the state the byte-to-byte function $T_{i,j}$ be defined by $T_{i,j}(x_{i,j}) = k_{i,j}^{11} \oplus S(x_{i,j} \oplus k_{i,j}^{10})$. Furthermore, let $e_0 = (e_{0,1}, e_{0,2}, \ldots, e_{0,16})$ be a default external byte-encoding. Then, the last round of the white-box implementation is defined by 16 byte-to-byte lookup tables that implement the functions $e_{0,i,j} \circ T_{i,j}$. FIG. 6 illustrates the computation of an externally encoded output byte from the input to round 9 (hence, it depicts both Rounds 9 and 10).

In FIG. 6, Q-boxes 610, 612, 614, 616 of round 9 receive input bytes and produce output bytes. The output bytes from the Q-boxes 610, 612, 614, 616 are combined by the XOR network including XORs 620, 622, 624 to produce the output $z_{2,3}$. The output $z_{2,3}$ may be input into the T-box 640 of round 10. The T-box 640 of round 10 applies a default external encoding $e_0$. The white-box implementation of FIG. 6 may be extended to the embodiment illustrated in FIG. 7.

Figure 7:
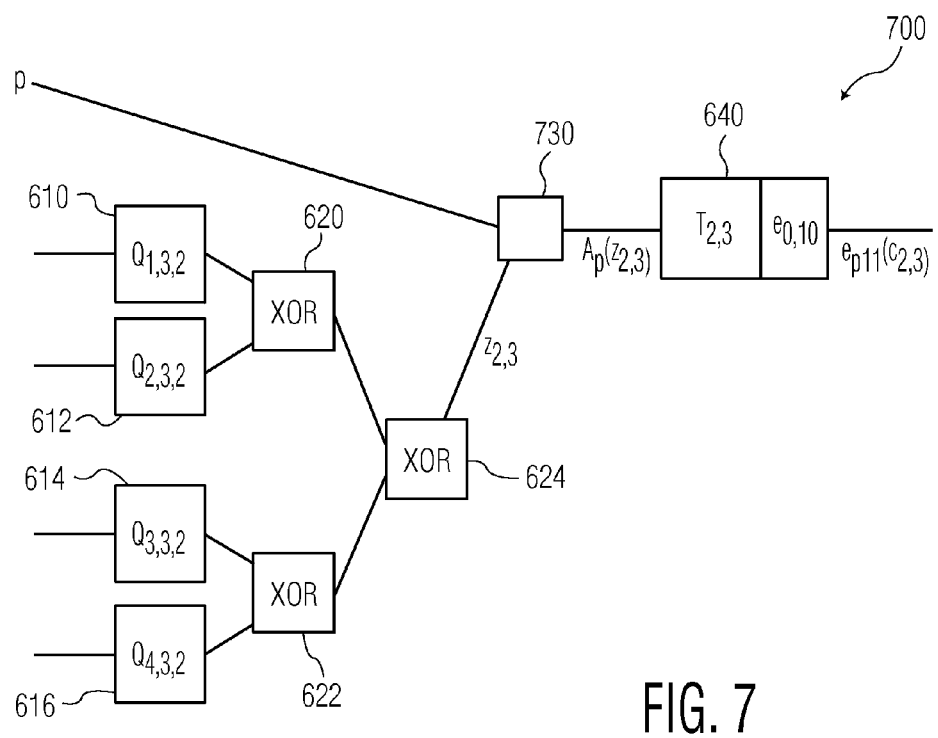
FIG. 7 illustrates an embodiment of a white-box implementation including two possible different external encodings.

FIG. 7 illustrates an embodiment of a white-box implementation including two possible different external encodings. The two external output encodings may be $e_1 = (e_{1,1}, e_{2,2}, \ldots, e_{1,16})$ and $e_2 = (e_{2,1}, e_{2,2}, \ldots, e_{2,16})$. For each i, let the $i^{th}$ component of the external encoding $e_p$ be such that the following equation is satisfied $$e_{0,i} \circ \oplus_{k_i^{11}} \circ S \circ \oplus_{k_i^{10}} = e_{p,i} \circ \oplus_{k_i^{11}} \circ S \circ \oplus_{k_i^{10}} \circ A_p^{-1} \qquad (4)$$

where, $A_p$ is, again, a randomly chosen bijective linear function. If $e_1$ is chosen randomly, then this equation holds for p=1, 2 if $$e_{0,i} = e_{1,i} \circ \oplus_{k_i^{11}} \circ S \circ \oplus_{k_i^{10}} \circ A_1^{-1} \circ \oplus_{k_i^{10}} \circ S^{-1} \circ \oplus_{k_i^{11}} \qquad (5)$$

and $$e_{2,i} = e_{0,i} \circ \oplus_{k_i^{11}} \circ S \circ \oplus_{k_i^{10}} \circ A_2 \circ \oplus_{k_i^{10}} \circ S^{-1} \circ \oplus_{k_i^{11}}. \qquad (6)$$

Let $z_{i,j}$ denote output byte (i,j) from round 9, and let $c_{i,j}$ be the $(i,j)^{th}$ output byte of round 10 without an external encoding applied to it, i.e., the $(i,j)^{th}$ output byte of round 10 of the implemented cipher. From (4) it follows that if all T-boxes $T_{i,j}$ in round 10 having a default external encoding $E_0$ are provided with $A_p(z_{i,j})$ instead of $z_{i,j}$, then the output bytes $c_{i,j}$ are encoded by external encoding $e_p$, which is the goal.

The white-box implementation 700 of FIG. 7 adds encoding compensator 730 to the white-box implementation 600 of FIG. 6. The encoding compensator 730 receives p and $z_{2,3}$ as inputs and produces an output $A_p(z_{2,3})$. The T-box 640 now receives $A_p(z_{2,3})$ as an input and produces an output byte $c_{i,j}$ encoded by $e_p$ instead of $e_0$.

The value p may be received in the same way as described above with respect to the first embodiment. Further, the first and second embodiments may be included in a single white-box implementation to provide multiple input and output encodings based upon p. Also, the second embodiment may be extended to include more than 2 different encodings.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, a white-box system may include a computer implementing a white-box computer program. Such system, may also include other hardware elements including storage, network interface for transmission of data with external systems as well as among elements of the white-box system.

In an embodiment of the invention, the computer program may include computer program code adapted to perform all the steps of a method according to the invention when the computer program is run on a computer. Preferably, the computer program is embodied on a non-transitory computer readable medium.

Further, because white-box cryptography is often very complicated and/or obfuscated it is tedious for a human to write. It is therefore of advantage to have a method to create the cryptographic system according to the embodiments of the invention in an automated manner.

A method of creating the cryptographic system according to the invention may be implemented on a computer as a computer implemented method, or in dedicated hardware, or in a combination of both. Executable code for a method according to the invention may be stored on a computer program medium. In such a method, the computer program may include computer program code adapted to perform all the steps of the method when the computer program is run on a computer. The computer program is embodied on a non-transitory computer readable medium.

The cryptographic system described herein may be implemented on a user device such as a mobile phone, table, computer, set top box, smart TV, etc. A content provider, such as a television network, video stream service, financial institution, music streaming service, etc., may provide software to the user device for receiving encrypted content from the content provider. That software may have the encryption key embedded therein as described above, and may also include binding strings as described above. Then the content provider may send encrypted content to the user device, which may then decrypt using the supplied software and use the content.

Figure 8:
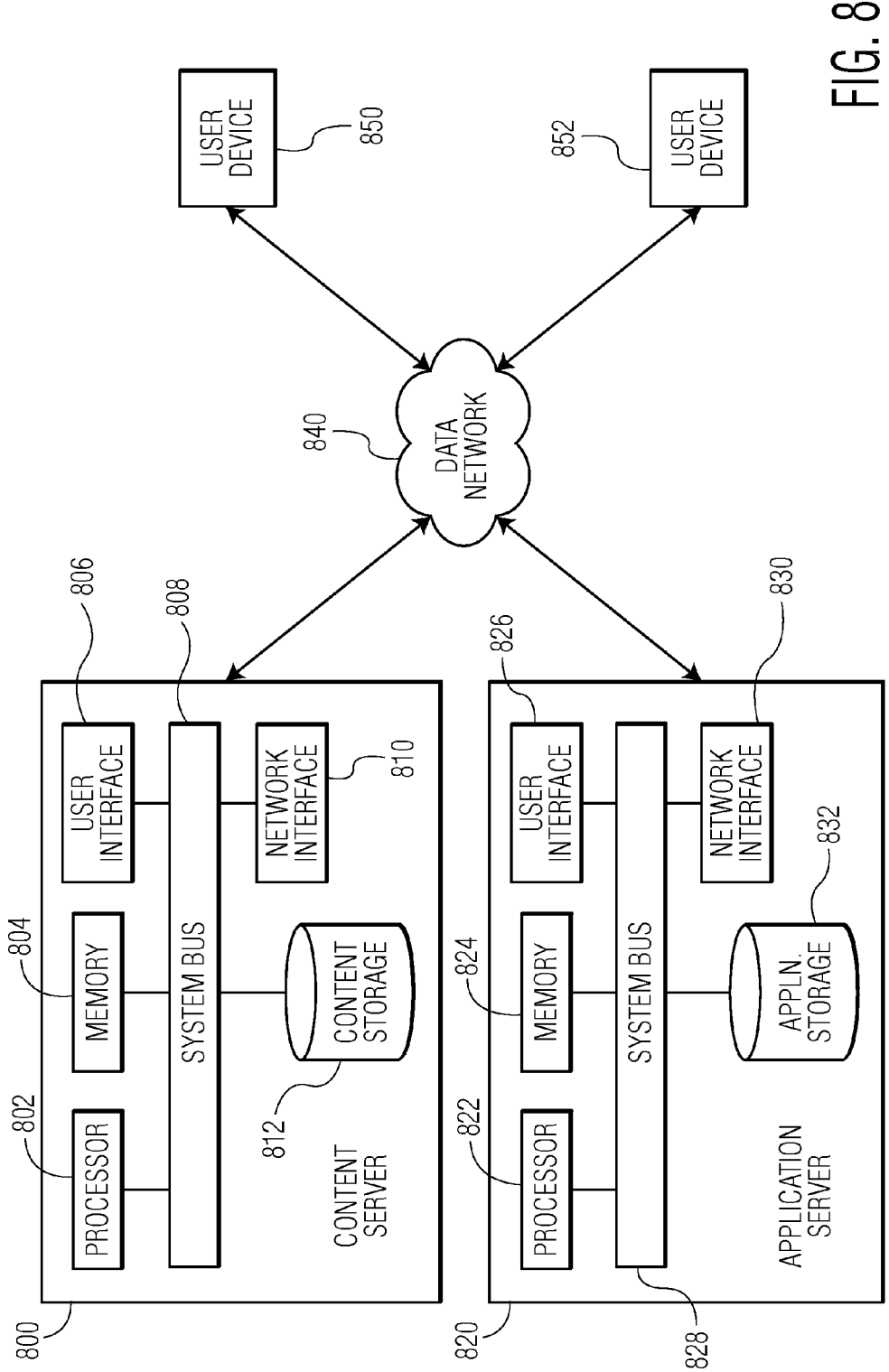
FIG. 8 illustrates a system for providing a user device secure content and a software application that processes the secure content.

FIG. 8 illustrates a system for providing a user device secure content and a software application that processes the secure content. The system includes a content server 800, application server 880, user devices 850, 852, and a data network 840. The user devices 850, 852 may request access to secure content provided by the content server 800 via data network 840. The data network can be any data network providing connectivity between the user devices 850, 852 and the content server 800 and application server 880. The user devices 850, 852 may be one of a plurality of devices, for example, set top boxes, media streamers, digital video recorders, tablets, mobile phones, laptop computers, portable media devices, smart watches, desktop computers, media servers, etc.

The user request for access may first require the downloading of a software application that may be used to process the secure content provided by the content server 800. The software application may be downloaded from the application server 880. The software application may be obscured using the techniques described above as well as operate as described above. Once the user devices 850, 852 install the software application, the user device may then download secure content from the content server 800 and access the secure content using the downloaded software application. For example, the downloaded software application may perform decryption of encrypted content received from the content server. In other embodiments, the software application may perform other secure operations, such as for example, encryption, digital signature generation and verification, etc.

The content server 800 may control the access to the secure content provided to the user devices 850, 852. As a result when the content server 800 receives a request for secure content, the content server 800 may transmit the secure content to the requesting user device. Likewise, the application server 820 may control access to the software application provided to the user devices 850, 852. As a result when the content server 820 receives a request for the software application, the application server 820 may transmit the software application to the requesting user device. A user device requesting the software application or secure content may also be authenticated by the respective servers, before providing the software application or secure content to the user device.

The content server 800 may include a processor 802, memory 804, user interface 806, network interface 810, and content storage 812 interconnected via one or more system buses 808. It will be understood that FIG. 8 constitutes, in some respects, an abstraction and that the actual organization of the components of the device 800 may be more complex than illustrated.

The processor 802 may be any hardware device capable of executing instructions stored in memory 804 or storage 812. As such, the processor may include a microprocessor, field programmable gate array (FPGA), application-specific integrated circuit (ASIC), or other similar devices.

The memory 804 may include various memories such as, for example L1, L2, or L3 cache or system memory. As such, the memory 802 may include static random access memory (SRAM), dynamic RAM (DRAM), flash memory, read only memory (ROM), or other similar memory devices.

The user interface 806 may include one or more devices for enabling communication with a user such as an administrator. For example, the user interface 806 may include a display, a mouse, and a keyboard for receiving user commands.

The network interface 810 may include one or more devices for enabling communication with other hardware devices. For example, the network interface 810 may include a network interface card (NIC) configured to communicate according to the Ethernet protocol. Additionally, the network interface 810 may implement a TCP/IP stack for communication according to the TCP/IP protocols. Various alternative or additional hardware or configurations for the network interface 810 will be apparent.

The content storage 812 may include one or more machine-readable content storage media such as read-only memory (ROM), random-access memory (RAM), magnetic disk storage media, optical storage media, flash-memory devices, or similar storage media. In various embodiments, the content storage 812 may store content to be provided to users.

The application server 820 includes elements like those in the content server 800 and the description of the like elements in the content server 800 apply to the application server 820. Also, the content storage 812 is replaced by application storage 832. Further, it is noted that the content server and applications server may be implemented on a single server. Also, such servers may be implemented on distributed computer systems as well as on cloud computer systems.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable storage medium encoded with instructions for execution by a keyed cryptographic operation by a cryptographic system mapping an encoded input message to an output message, comprising:
   instructions for receiving an encoding selection parameter p;
   instructions for receiving the encoded input message, wherein the encoding on the input message corresponds to the encoding selection parameter p;
   instructions for decoding the input message using an inverse of a default input encoding, wherein the default encoding is different from the encoding on the input message and wherein the default input encoding is determined based upon the encoding on the input message and a randomly selected bijective linear function associated with the encoding selection parameter p;
   instructions for computing a first portion of the keyed cryptographic operation on the decoded input message to produce a first portion output; and
   instructions for compensating the first portion output based upon the encoding selection parameter p.

2. The non-transitory machine-readable storage medium of claim 1, wherein the encoding parameter p is received as part of the encoded input message.

3. The non-transitory machine-readable storage medium of claim 1, wherein the first portion output is encoded by a function $A_p$ and wherein compensating the first portion output includes applying the inverse of the function $A_p$.

4. The non-transitory machine-readable storage medium of claim 3, wherein $E_p$ is the encoding on the input message, wherein $E_0$ is the encoding corresponding to the default decoding, wherein the functions $A_p$ and $A_1$ are randomly selected linear functions, wherein $E_1$ is randomly selected encoding, and wherein the following conditions are met:

$$E_0 = E_1 \circ \oplus_k \circ S^{-1} \circ A_1^{-1} \circ S \circ \oplus_k$$

and $$E_p = E_0 \circ \oplus_k \circ S^{-1} \circ A_p^{-1} \circ S \circ \oplus_k,$$

wherein, S is a substitution box function, $A_1^{-1}$ is the inverse of the function $A_1$, and $\oplus_k$ is a function that XORs a key k with the input of the function.

5. The non-transitory machine-readable storage medium of claim 1, wherein, the keyed cryptographic operation is an AES encryption operation.

6. The non-transitory machine-readable storage medium of claim 1, wherein lookup tables implement the keyed cryptographic operation.

7. The non-transitory machine-readable storage medium of claim 1, wherein finite state machines implement keyed cryptographic operation.

8. A non-transitory machine-readable storage medium encoded with instructions for execution by a keyed cryptographic operation by a cryptographic system mapping an input message to an encoded output message, comprising:
   instructions for receiving a encoding selection parameter p;
   instructions for receiving the input message;
   instructions for computing a first portion of the keyed cryptographic operation on the input message to produce a first portion output;
   instructions for compensating the first portion output based upon the encoding selection parameter p;
   instructions for performing a second portion of the keyed cryptographic operation on the compensated first portion output to produce a second portion output; and
   instructions for encoding the second portion output using a default output encoding, wherein the default output encoding is different from a resulting encoding on the output message and wherein the default output encoding is determined based upon the encoding on the output message and a randomly selected bijective linear function associated with the encoding selection parameter p.

9. The non-transitory machine-readable storage medium of claim 8, wherein the encoding parameter p is received as part of the input message.

10. The non-transitory machine-readable storage medium of claim 8, wherein compensating the first portion output includes applying a function $A_p$ to the first output.

11. The non-transitory machine-readable storage medium of claim 10, wherein $e_p$ is the encoding on the output message, wherein $e_0$ is the encoding corresponding to the default decoding, wherein the functions $A_p$ and $A_1$ are randomly selected linear functions, wherein $e_1$ is randomly selected encoding, and wherein the following conditions are met:

$$e_0 = e_1 \circ \oplus_k^N \circ S \circ \oplus_k^{N-1} \circ A_1^{-1} \circ \oplus_k^{N-1} \circ S^{-1} \circ \oplus_k^N$$

and $$e_p = e_0 \circ \oplus_k^N \circ S \circ \oplus_k^{N-1} \circ A_p \circ \oplus_k^{N-1} \circ S^{-1} \circ \oplus_k^N$$

where $\oplus_k^{N-1}$ is a function that XORs the key $k^{N-1}$ in the second to last round with the input of the function and $\oplus_k^N$ is a function that XORs the key $k^N$ in the last round with the input of the function, wherein, S is a substitution box function and $A_1^{-1}$ is the inverse of the function $A_1$.

12. The non-transitory machine-readable storage medium of claim 8, wherein, the keyed cryptographic operation is an AES cryptographic operation.

13. The non-transitory machine-readable storage medium of claim 8, wherein lookup tables implement the keyed cryptographic operation.

14. The non-transitory machine-readable storage medium of claim 8, wherein finite state machines implement keyed cryptographic operation.

15. A method of performing a keyed cryptographic operation by a cryptographic system mapping an encoded input message to an output message, comprising:
   receiving an encoding selection parameter p;
   receiving the encoded input message, wherein the encoding on the input message corresponds to the encoding selection parameter p;
   decoding the input message using an inverse of a default input encoding, wherein the default encoding is different from the encoding on the input message and wherein the default input encoding is determined based upon the encoding on the input message and a randomly selected bijective linear function associated with the encoding selection parameter p;
   computing a first portion of the keyed cryptographic operation on the decoded input message to produce a first portion output; and
   compensating the first portion output based upon the encoding selection parameter p.

16. The method of claim 15, wherein the encoding parameter p is received as part of the encoded input message.

17. The method of claim 15, wherein the first portion output is encoded by a function $A_p$ and wherein compensating the first portion output includes applying the inverse of the function $A_p$.

18. The method of claim 17, wherein $E_p$ is the encoding on the input message, wherein $E_0$ is the encoding corresponding to the default decoding, wherein the functions $A_p$ and $A_1$ are randomly selected linear functions, wherein $E_1$ is randomly selected encoding, and wherein the following conditions are met:

$$E_0 = E_1 \circ \oplus_k \circ S^{-1} \circ A_1^{-1} \circ S \circ \oplus_k$$

and $$E_p = E_0 \circ \oplus_k \circ S^{-1} \circ A_p^{-1} \circ S \circ \oplus_k,$$

wherein, S is a substitution box function, $A_1^{-1}$ is the inverse of the function $A_1$, and $\oplus_k$ is a function that XORs a key k with the input of the function.

19. The method of claim 15, wherein, the keyed cryptographic operation is an AES encryption operation.

20. The method of claim 15, wherein lookup tables implement the keyed cryptographic operation.

21. The method of claim 15, wherein finite state machines implement keyed cryptographic operation.

22. A method of performing a keyed cryptographic operation by a cryptographic system mapping an input message to an encoded output message, comprising:
  receiving a encoding selection parameter p;
  receiving the input message;
  computing a first portion of the keyed cryptographic operation on the input message to produce a first portion output;
  compensating the first portion output based upon the encoding selection parameter p;
  performing a second portion of the keyed cryptographic operation on the compensated first portion output to produce a second portion output; and
  encoding the second portion output using a default output encoding, wherein the default output encoding is different from a resulting encoding on the output message and wherein the default output encoding is determined based upon the encoding on the output message and a randomly selected bijective linear function associated with the encoding selection parameter p.

23. The method of claim 22, wherein the encoding parameter p is received as part of the input message.

24. The method of claim 23, wherein compensating the first portion output includes applying a function $A_p$ to the first output.

25. The method of claim 24, wherein $e_p$ is the encoding on the output message, wherein $e_0$ is the encoding corresponding to the default decoding, wherein the functions $A_p$ and $A_1$ are randomly selected linear functions, wherein $e_1$ is randomly selected encoding, and wherein the following conditions are met:

$$e_0 = e_1 \circ \oplus_k^N \circ S \circ \oplus_k^{N-1} \circ A_1^{-1} \circ \oplus_k^{N-1} \circ S^{-1} \circ \oplus_k^N$$

and $$e_p = e_0 \circ \oplus_k^N \circ S \circ \oplus_k^{N-1} \circ A_p \circ \oplus_k^{N-1} \circ S^{-1} \circ \oplus_k^N$$

where $\oplus_k^{N-1}$ is a function that XORs the key $k^{N-1}$ in the second to last round with the input of the function and $\oplus_k^N$ is a function that XORs the key $k^N$ in the last round with the input of the function, wherein, S is a substitution box function and $A_1^{-1}$ is the inverse of the function $A_1$.

26. The method of claim 22, wherein, the keyed cryptographic operation is an AES cryptographic operation.

27. The method of claim 22, wherein lookup tables implement the keyed cryptographic operation.

28. The method of claim 22, wherein finite state machines implement keyed cryptographic operation.

* * * * *